United States Patent Office 3,144,306
Patented Aug. 11, 1964

3,144,306
PRODUCTION OF BORON TRICHLORIDE BY HYDROCHLORINATION OF TITANIUM DIBORIDE
Frank H. May, Whittier, and James L. Bradford, Anaheim, Calif., assignors to American Potash & Chemical Corporation, a corporation of Delaware
No Drawing. Filed Jan. 16, 1961, Ser. No. 82,717
3 Claims. (Cl. 23—205)

This invention relates to the manufacture of boron trichloride from titanium diboride and hydrogen chloride, in accordance with the reaction:

(1) $\quad TiB_2 + 10HCl \rightarrow TiCl_4 + 2BCl_3 + 5H_2$

Boron trichloride has many industrial uses. Heretofore, it has been produced by the reaction of boron carbide and chlorine or a mixture of boric oxide and carbon with chlorine at a temperature of the order of 700–1000° C. In the latter method, a substantial portion of the chlorine may be wasted in reaction with the by-product carbon monoxide to form phosgene, which is difficult to separate from boron trichloride. Any reaction at temperatures of 700° C. and above, involving chlorine, requires special conditions and materials of construction. The processing difficulties and corrosion problems contribute appreciably to a high cost of production.

Hydrogen chloride is relatively inexpensive as compared to chlorine, being a waste product in many industries such as in the production of chlorohydrocarbons. Hydrogen chloride is also a by-product in many of the processes in which boron trichloride is used as a raw material. It would, therefore, be highly advantageous if hydrogen chloride could be substituted for chlorine in the reaction with boron carbide. However, the reaction between boron carbide and hydrogen chloride does not proceed except at relatively high temperatures (above about 1000° C.) and, for practical rates and efficiency, temperatures of as high as 1500° C. are required. Boron trichloride produced at such a temperature must inherently involve a relatively high cost of production.

We have found that titanium diboride reacts readily with hydrogen chloride at a temperature between about 400° C. and above; the optimum is between about 600°–800° C. Hydrogen chloride and the products of the chlorination reaction are far less corrosive than chlorine. This makes it possible to carry out the reaction continuously between titanium diboride and hydrogen chloride in metal equipment, such as stainless steel. We have, for example, successfully used stainless steel tubing to contain this reaction in the temperature range indicated above (600–800° C.).

The products of the reaction of titanium diboride and hydrogen chloride are readily separated, namely, boron trichloride, titanium tetrachloride and hydrogen. If desired, the titanium tetrachloride can be recovered and re-used. Thus, one can proceed to hydrolze the titanium tetrachloride and form titanium dioxide and hydrogen chloride. The titanium dioxide can also be reacted with boric oxide and carbon to form additional titanium boride. The series of reactions are as follows:

(1) $\quad TiB_2 + 10HCl \rightarrow TiCl_4 + 2BCl_3 + 5H_2$
(2) $\quad TiCl_4 + 2H_2O \rightarrow TiO_2 + 4HCl$
(3) $\quad TiO_2 + B_2O_3 + 5C \rightarrow TiB_2 + 5CO$ (4) $\quad 6HCl + 2H_2O + B_2O_3 + 5C \rightarrow 2BCl_3 + 5H_2 + 5CO$ The summation Reaction 4 is, of course, theoretical, but it does show the cyclic use of titanium and that, within the efficiency of the several reactions, the only titanium content which need be added is that required as make-up.

The practice of the invention will become further apparent from the following specific examples which are illustrative of the present preferred practice of the invention.

EXAMPLE I

A stainless steel tube was provided in a combustion furnace and a fixed bed of titanium diboride was placed in the tube. Hydrogen chloride was passed through the tube at various temperatures and the gaseous products was sampled and examined on an infrared spectrophotometer. Eighteen runs were made in this manner to investigate such variables as temperature, flow rate, hydrogen dilution and boron trichloride dilution. The pertinent data, together with the calculated conversion efficiencies, are given in Table I.

*Table I*

PREPARATION OF BORON TRICHLORIDE AND TITANIUM TETRACHLORIDE FROM TITANIUM DIBORIDE AND HYDROGEN CHLORIDE

| Run No. | Temp. (° C.) | Feed gas (mole percent) | | | Total flow (cc./min.) | Product gas (mole percent) | | Conversion efficiency [1] (percent) | Remarks |
|---|---|---|---|---|---|---|---|---|---|
| | | HCl | H$_2$ | BCl$_3$ | | HCl | BCl$_3$ | | |
| 1 | 400 | 100 | | | 200 | 90.8 | 1.7 | 8.6 | Threshold. |
| 2 | 500 | 100 | | | 200 | 34.8 | 20.7 | 74.8 | |
| 3 | 600 | 100 | | | 200 | 30.7 | 22.2 | 78.4 | |
| 4 | 700 | 100 | | | 200 | 36.6 | 20.0 | 73.3 | |
| 5 | 800 | 100 | | | 200 | 43.2 | 18.7 | 72.4 | |
| 6 | 800 | 100 | | | 600 | 46.6 | 15.8 | 62.9 | Trace SiCl$_4$. |
| 7 | 800 | 67 | 33 | | 600 | 49.7 | 6.7 | 40.2 | |
| 8 | 800 | 50 | 50 | | 600 | 40.3 | 2.4 | 22.7 | |
| 9 | 600 | 100 | | | 600 | 83.0 | 2.9 | 14.6 | |
| 10 | 800 | 100 | | | 600 | 59.3 | 12.1 | 50.5 | |
| 11 | 1,000 | 100 | | | 600 | 46.2 | 16.3 | 63.8 | Trace SiCl$_4$. |
| 12 | 800 | 100 | | | 100 | 39.3 | 15.7 | 66.7 | |
| 13 | 800 | 100 | | | 200 | 41.8 | 17.2 | 67.3 | |
| 14 | 800 | 64.3 | | 35.7 | 560 | 42.7 | 43.9 | 36.5 | |
| 15 | 1,000 | 64.3 | | 35.7 | 560 | 39.3 | 45.0 | 41.5 | Trace SiCl$_4$. |
| 16 | 1,000 | 100 | | | 200 | 45.2 | 16.1 | 64.1 | |
| 17 | 800 | 100 | | | 200 | 47.7 | 15.2 | 61.4 | |
| 18 | 600 | 100 | | | 600 | 88.7 | 3.0 | 14.4 | |

[1] HCl Conversion Mole Percent = $\frac{100(3BCl_3 + 4TiCl_4)}{HCl + 3BCl_3 + 4TiCl_4} = \frac{100(5BCl_3)}{HCl + 5BCl_3}$; $(TiCl_4 = \frac{BCl_3}{2})$.

EXAMPLE II

To ascertain the completeness of the hydrochlorination reaction, some of the runs were continued until the $TiB_2$ was completely reacted. The residual solid material was sampled and was found to be 97% carbon, the amount corresponding very closely to the amount indicated by analysis of the $TiB_2$ starting material. The condensed product was sampled and analyzed for boron, titanium and chlorine. The boron to titanium ratio in the condensed product was found to be 1.4, whereas the starting material had a boron to titanium ratio of 1.7. It was determined that this apparent discrepancy was due to an appreciable loss of highly volatile boron trichloride during sampling.

EXAMPLE III

To demonstrate the ease with which the two volatile metal chloride products are separated, the gaseous product from one of the runs was fractionally condensed on a continuous basis as follows:

The first stage of the condensing system employed a tap water condenser at 20° C., and the second stage employed a Dry-Ice acetone condenser at −80° C. The two simple condensate fractions thus obtained were found to contain 97% $TiCl_4$ and 1.6% $BCl_3$ in the first stage condensate, and 22.2% $TiCl_4$ and 77.6% $BCl_3$ in the second stage.

These preliminary results indicate that, using a more efficient fractionation system, a complete separation of volatile chlorides is easily possible.

EXAMPLE IV

To show that $TiCl_4$ and $BCl_3$ gaseous products are obtained in high yield and in the ratio as shown in Reaction 1, the following run was carried on:

In this run 48 grams of anhydrous hydrogen chloride gas was fed into a heated Vycor tube furnace (700° C.) at the rate of 14.8 grams per hour; the furnace held 59.5 grams of $TiB_2$ (67% Ti, 30.3% B, B/Ti=2.00).

The effluent volatile chlorides were totally condensed in an appropriately cooled receiving system, weighed and analyzed for titanium, boron and chlorine content. From the material balance, 23.71 grams of $TiCl_4$ and 29.22 grams of $BCl_3$ were produced in essentially a B/Ti ratio of 2.00; a 95% conversion efficiency, based on hydrogen chloride consumed, was achieved in this run. The Vycor tube furnace, after cooling was found to contain 50.8 grams of unreacted $TiB_2$ starting material indicating that 8.7 grams of titanium boride were consumed in the reaction.

EXAMPLE V

Another hydrochlorination run was carried out at 800° C. using the previously described apparatus and procedure of Example IV. In this run, 59.5 grams of hydrogen chloride were fed at the rate of 17.8 grams per hour over 59.6 grams of titanium diboride. At the end of the run 48.5 grams of unreacted boride were recovered from the tube furnace and 29.13 grams of $TiCl_4$ and 35.79 grams of $BCl_3$ (1.99 B/Ti mole ratio) were collected in the receiving system; based on hydrogen chloride consumed, a 97.8% conversion was demonstrated.

We claim:

1. A process for producing boron trichloride comprising reacting titanium boride and hydrogen chloride at a temperature above about 500° C. to produce boron trichloride, titanium tetrachloride and hydrogen and recovering the boron trichloride.

2. A process for producing boron trichloride comprising reacting titanium boride and hydrogen chloride at a temperature between about 500° and 700° C. substantially in accordance with the following:

$$TiB_2 + 10HCl \rightarrow TiCl_4 + 2BCl_3 + 5H_2$$

and recovering the boron trichloride.

3. A process for producing boron trichloride comprising reacting in a steel reaction vessel titanium boride and hydrogen chloride at a temperature between about 400° and 800° C. to produce boron trichloride, and recovering the boron trichloride.

References Cited in the file of this patent

Schecther et al.: "Boron Hydrides and Related Compounds," 2nd Edition, prepared by Callery Chemical Co., printed May, 1954, declassified January 6, 1958, page 134.

Mellor: "Comprehensive Treatise on Inorganic and Theoretical Chemistry," 1924, vol. 5, page 15.